United States Patent
Barrett et al.

(10) Patent No.: US 7,885,995 B2
(45) Date of Patent: Feb. 8, 2011

(54) PROCESSING SERVICE REQUESTS IN A DISTRIBUTED ENVIRONMENT

(75) Inventors: Claudia Susan Barrett, Wake Forest, NC (US); Joseph Kuruvilla Chacko, Sheffield (GB); Krithika Kashinath, Bangalore (IN); Shirish Trivikram Kuncolienkar, Bangalore (IN); Leonardo A. Uzcategui, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/118,197

(22) Filed: May 9, 2008

(65) Prior Publication Data

US 2008/0313266 A1 Dec. 18, 2008

(30) Foreign Application Priority Data

Jun. 13, 2007 (EP) .................................. 07110161

(51) Int. Cl.
*G06F 15/16* (2006.01)
(52) U.S. Cl. ........................ 709/202; 709/203; 709/223; 370/235
(58) Field of Classification Search ................. 709/202, 709/203, 223; 370/235
See application file for complete search history.

(56) References Cited

U.S. PATENT DOCUMENTS

| 5,958,016 A * | 9/1999 | Chang et al. ................. 709/229 |
| 7,221,753 B2 * | 5/2007 | Hutton et al. .......... 379/265.11 |
| 7,561,517 B2 * | 7/2009 | Klinker et al. ............... 370/235 |
| 7,613,768 B2 * | 11/2009 | Harville et al. ............. 709/203 |
| 2003/0182413 A1 * | 9/2003 | Allen et al. ................. 709/223 |
| 2004/0024856 A1 * | 2/2004 | Gere .......................... 709/223 |

* cited by examiner

*Primary Examiner*—Kyung-Hye Shin
(74) *Attorney, Agent, or Firm*—Fox Rothschild, LLP; Robert J. Sacco

(57) ABSTRACT

A computer-implemented method for processing service requests in a distributed environment includes routing a type of service request to a first service provider in the distributed environment, the first service provider having a commitment level for handling the service request type, detecting a second service provider in the distributed environment capable of handing the service request type, determining a commitment level of the second service provider to handle the service request type, and responsive to the commitment level of the second provider exceeding the commitment level of the first provider, routing the service request type to the second service provider.

17 Claims, 3 Drawing Sheets

200

PROCESSING SERVICE REQUESTS IN A DISTRIBUTED ENVIRONMENT

CROSS REFERENCE TO RELATED APPLICATIONS

The present application claims the benefit of United Kingdom Application No. 07110161.2 filed Jun. 13, 2007, entitled "SERVICE PROVIDER IDENTIFICATION" which is incorporated by reference in its entirety into the present application.

FIELD OF THE INVENTION

The present invention relates to the field of distributed computing, and more particularly to systems and methods for processing service requests in a distributed computing environment.

BACKGROUND

As the number of computer systems accessing the internet continues to increase, the number of different types of computer systems also continues to grow. As a result, one issue that typically arises is ensuring interoperability between different types of computer systems distributed over a computer network. Interoperability allows communication between independently developed and configured computer systems. Generally, such interoperability is achieved by using a set of agreed-upon communications protocols. Using such protocols, a client of one computer system can typically invoke operations in a different computer system. Consequently, the interoperability permits client systems to invoke processes in server systems independent of their respective locations.

Despite the ability to service requests from multiple client systems, server systems generally still have problems automatically handling service requests from such client systems. In particular, if a server system is associated with two or more resources that provide identical or overlapping services, the server system may not automatically assign the service request to the best resource for managing the service request. As a result, some resources may be idled while other resources are overloaded with service requests they are not optimized to handle, decreasing overall performance. Furthermore, it is generally difficult for an operator of the client system or the server system to determine an issue exists.

Therefore, what is needed is a system and method for improving processing of service requests in a distributed environment having resources providing identical or overlapping services.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In a first embodiment of the present invention, a computer-implemented method for processing service requests in a distributed environment is provided. The method includes routing a type of service request to a first service provider in the distributed environment, the first service provider having a commitment level for handling the service request type, detecting a second service provider in the distributed environment capable of handing the service request type, determining a commitment level of the second service provider to handle the service request type, and responsive to the commitment level of the second provider exceeding the commitment level of the first provider, routing the service request type to the second service provider.

In a second embodiment of the present invention, a system for processing service requests in a distributed environment is provided. The system includes a first service provider for handling one types of service request, the first service provider specifying a commitment level for handling the service request type, at least one second service provider for handling the service request type, the one second service provider specifying a commitment level for handling the service request type, and a service manager for initially routing the service request type to the one first service provider and selectively rerouting the service request type to the one second service provider. In the system, the service manager is configured to compare commitment levels of the first service provider and the one second service provider, and where the one of the types of service requests is selectively rerouted to the one second service provider responsive to the commitment level of the one second provider exceeding the commitment level of the one first service provider.

In a third embodiment of the present invention, a computer-readable storage medium, having stored thereon a computer program for processing service requests in a distributed environment is provided. The computer program includes a plurality of code sections executable by a computer to cause the computer to perform the steps of: routing a type of service request to a first service provider in the distributed environment, the first service provider having a commitment level for handling the service request type; detecting a second service provider in the distributed environment capable of handing the service request type; determining a commitment level of the second service provider to handle the service request type; and responsive to the commitment level of the second provider exceeding the commitment level of the first provider, routing the service request type to the second service provider.

DETAILED DESCRIPTION OF THE DRAWINGS

Embodiments of the present invention provide systems and methods for processing service requests from client systems using different computing resources. In particular, embodiments of the present invention provide for automatically determining which one among two or more computing resources should process specific types of service requests from client systems and automatically routing such service requests to the correct computing resource. The routing can be based on a commitment level of the various computing resources to each type of service request and/or a comparison of the computing resources using one or more criteria. Accordingly, embodiments of the present invention provide for automatically routing and/or rerouting service requests as one or more computing resources having higher commitment levels are discovered or are made available to handle various types of service requests.

Figure 1:
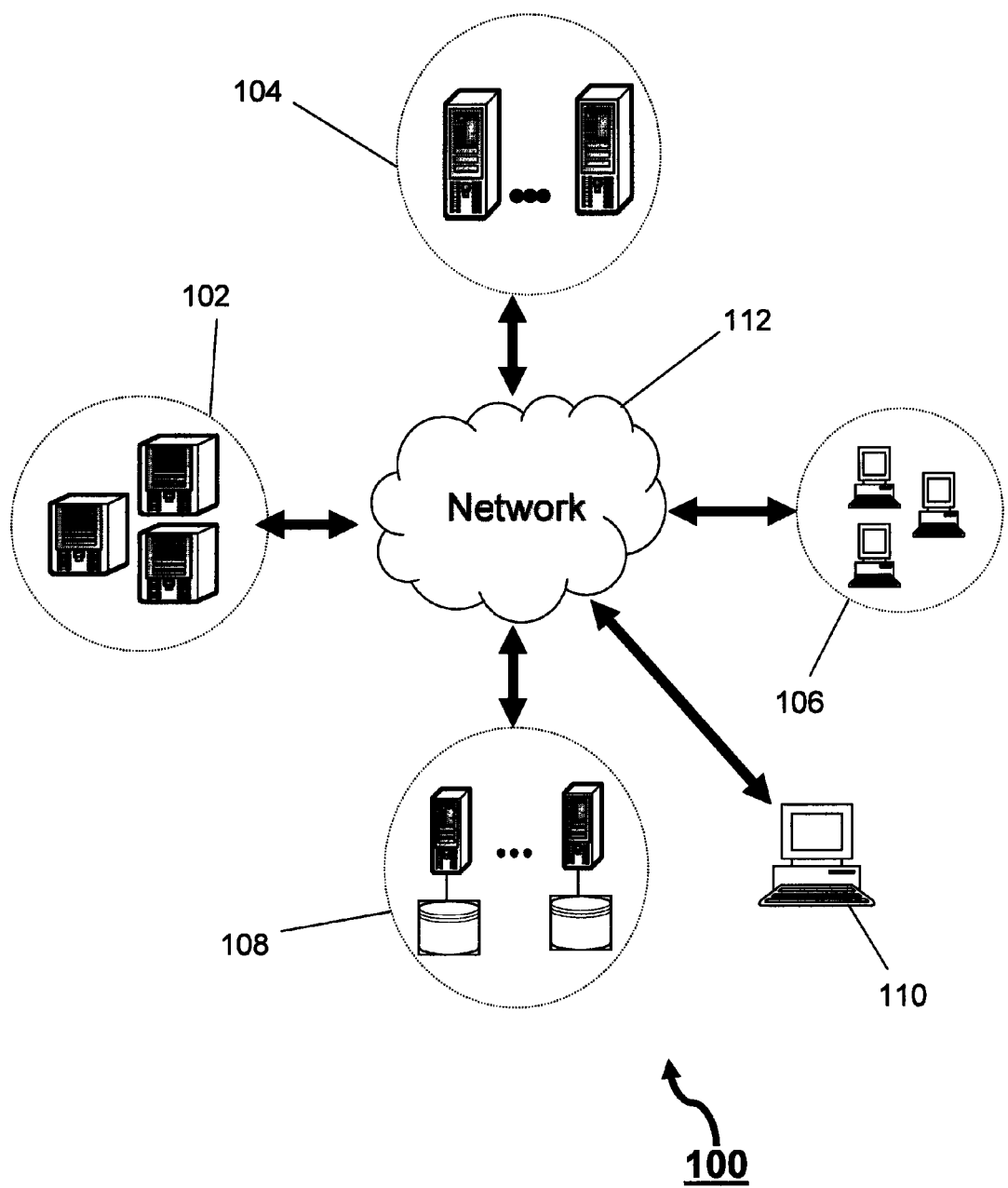
FIG. 1 is a schematic view of a system for managing service requests in a distributed environment that is useful for understanding the present invention.

FIG. 1 depicts an exemplary embodiment of a system 100 for processing service requests using a plurality of computing resources according to the various embodiments of the present invention. The system 100 includes one or more service managers (SM's) 102. For example an SM 102 can be a server computer system configured to operate a Java-based object request broker (ORB). An ORB is a piece of middleware software that allows programmers to make program calls from one computer to another via a network. Typically, ORB's handle the transformation of in-process data structures to and from the byte sequence, which is transmitted over the network. This is called marshalling or serialization. Some ORB's, such as Common Object Request Broker Architecture (CORBA) compliant systems, use an Interface Description Language (IDL) to describe the data which is to be transmitted on remote calls. In addition to marshalling data, ORB's often expose many more features, such as distributed transactions, directory services or real-time scheduling. In object-oriented languages, the ORB takes the form of an object with methods enabling connection to the objects being served. After an object connects to the ORB, the methods of that object become accessible for remote invocations. An ORB typically requires some means of obtaining the network address of the object that has now become remote.

The SM's are accessible by one or more objects, namely client systems 104 that submit service requests to one or more SM's 102. In the exemplary system 100, service requests are provided to the SM's 102 via one or more end-user interfaces or terminals 106 accessing the client systems 104. However, the invention is not limited in this regard and the client systems 104 can also be configured to automatically generate and submit service requests to the SM's 102. Based on the type of service request submitted to the SM's 102, the SM's 102 reroute the service requests to one or more service providers (SP's) 108 to process and fulfill the service requests.

In some embodiments, one or more engineer terminals 110 can also be used as an administrative interface to configure the SM's 102, the SP's 108, the client systems 104, or any combination thereof. However, in other embodiments at least one of the user terminals 108 can also be used as an administrative interface. In either case, the administrative interface can be used to access the SM's 102 and configure their operation. For example, via the administrative interface, an administrator can submit network and/or system properties of the SM's 102 and/or the SP's 108, one or more criteria for use by the SM's 102 to configure operation of the SP's 108, and instructions for the SM's 102 to monitor the SP's 108. However, the invention is not limited in this regard and the administrative interface can be used to configure any property of the SM's 102 or the SP's 108.

Although shown as single computing systems, the SM's 102 or SP's 108 can operate as centralized or decentralized computing devices. Furthermore, the SM's 102 or SP's 108 can be implemented as software components in a computing system. For example, in some embodiments, the SM's 102 can be implemented using an object request broker (ORB), as described above. However, the invention is not limited to solely Java-based applications and can be implemented in any language and/or on any computing platform.

Furthermore, as shown in FIG. 1, terminals 106 and 110 are connected by way of wire line or wireless access paths through a network 112 to the SM's 102, the client system 104, and the SP's 106. In the various embodiments, one or more of the terminals 106, 110 can be connected to the same or different components of the SM's 102, the client systems 104, and the SP's 106 over the network 112. Client systems 104 can also operate as single computing systems or as centralized or decentralized computing devices. For example, in the exemplary system 100, client systems 104 comprise one or more local or remote computing systems deployed over a network 112. Furthermore, although the SM's 102 and the SP's 108 are shown as discrete and remotely connected systems, it is also within the scope of the invention for the SM's 102 and the SP's 102 to operate as one or more single and/or locally coupled computing systems.

Additionally, it is within the scope of the invention for terminals 106 and 110 to represent any multimode communication device including, but not limited to, a cell phone, a personal computer or laptop, or personal digital assistant capable of supporting wire line and/or wireless communication technologies. In the case of wire line communications, terminals 106 and 110 can utilize xDSL, cable, or PSTN telephony interfaces for communicating over the network 112, which can include hybrid technologies that support circuit-switched packet-switched communications. The terminals 106 and 110 can also support accessory interfaces such as USB, Firewire, and other connectivity technologies.

Alternatively, or in combination, the terminals 106 and 110 can support any number of wireless communication protocols such as the family of 802.xx protocols defined by the Institute of Electrical and Electronics Engineers (IEEE). For instance, terminals 106 and 110 can utilize long-range wireless access technologies such as, for example, cellular, software defined radio (SDR) and/or WiMAX to communicate with the network 112. Cellular access technologies can include, for example, CDMA-1X, UMTS/HSDPA, GSM/GPRS, TDMA/EDGE, EV/DO, and next generation technologies as they emerge. Additionally, terminals 106 and 110 can support short-range wireless technologies such as WiFi, Bluetooth, Zigbee, or cordless communications such as digital enhanced cordless telecommunications (DECT).

Figure 2:
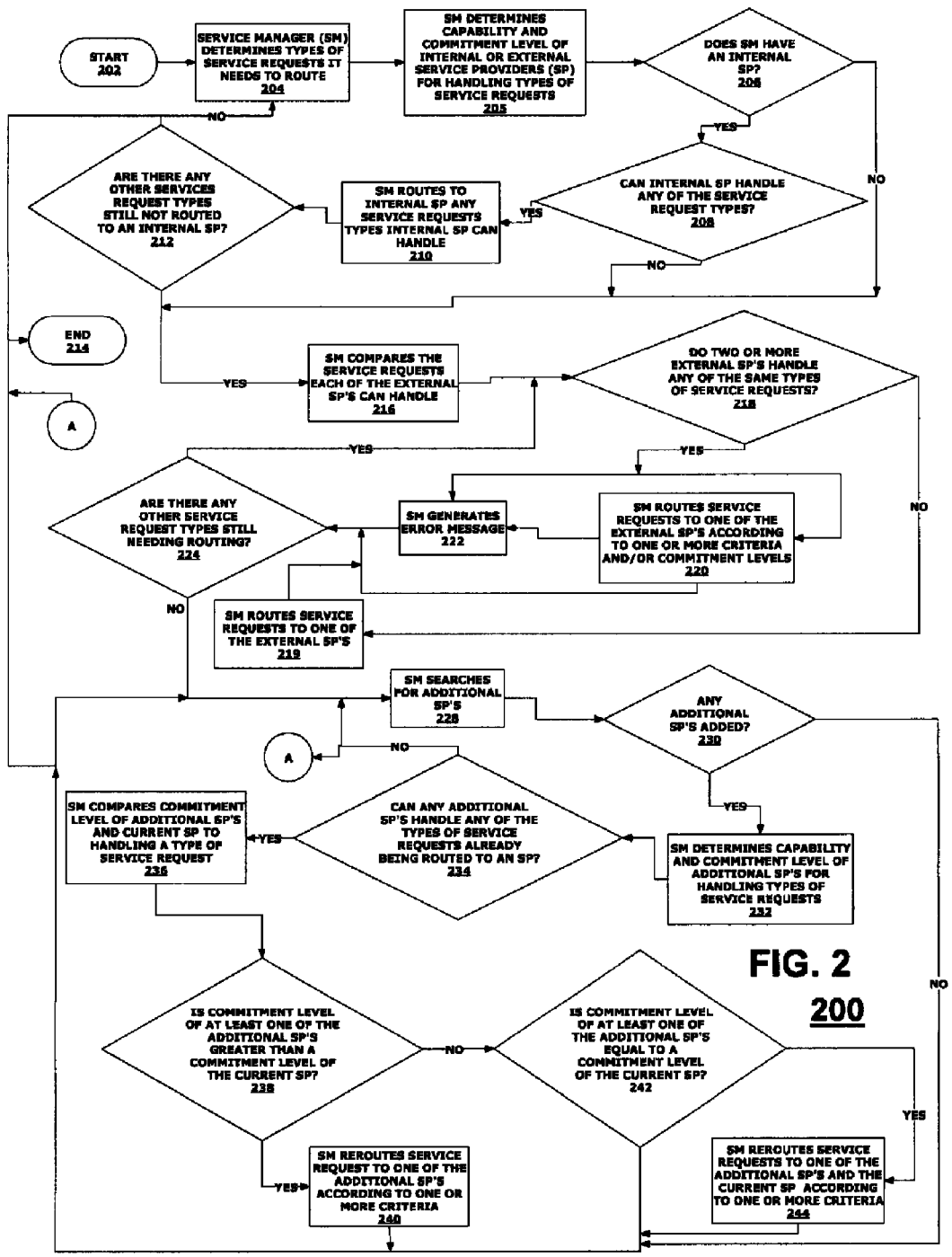
FIG. 2 is a flowchart of exemplary steps of a method for managing service requests in a distributed environment that is useful for understanding the present invention.

FIG. 2 illustrates an exemplary method 200 for processing of service requests according to an embodiment of the present invention. The method 200 can start in step 202 and continue to step 204. In step 204, a service manager (SM), as previously described, first determines the types of service requests it will need to route to the various SP's. The term "service requests", as used herein, refers to any type of request for action submitted by a client system. A service request can include a request for a particular action by one or more remote computing systems, one or more local computing systems, or any combination thereof. For example, a service request can specify the retrieval, deletion, storage, or any combination thereof, of data in one or more remote or local locations. In another example, a service request can specify the execution of one or more computer programs stored in one or more remote or local locations.

In the various embodiments, the type of requests are determined by the SM in various ways. In some embodiments, an administrative interface can be used to access the SM and define the various types of requests that will be received by the SM. In another embodiment, an SM can contact the client systems directly and retrieve the request type information. For example, an SM can poll the various client systems to determine their function, and thus determine the types of requests to be received from the client systems. In yet another embodiment, the various client systems can register with the SM, where the SM is provided with the various type of service requests each client system will need will need during the registration process.

The types of service requests needed by the client systems can be stored in a location accessible to the SM. For example, in a Java ORB-based implementation, they can be registered as client objects requiring specific types of services. In other embodiments, the services required can simply be stored as a list of service requests to be handled. However, regardless of how the SM determines and stores the types of service requests it will need to handle, once the types of service requests to be routed are determined in step 204, the SM can determine which SP's will be able to handle the service requests in step 205.

In step 205, the SM determines the types of service requests that any of the SP's can handle. That is, the SM can basically create a list of service requests that each SP is configured or has the capability to handle. However, as previously described, the SM determines routing of service requests based on a commitment level of the various service providers (SP's) to handle particular service types. Accordingly, in step 205, the SM also determines a commitment level of each SP to handling a type of service request.

In essence, the collection of the capabilities and the commitment levels from each of the SP's can be interpreted as bids for processing different types of service requests. However, the addition of commitment level to the bid creates a retractable or negotiable bid by an SP. That is, the bid specifies that an SP can handle a type of service request, but can also specify whether the SP approves of allowing the SM to reroute a service request initially routed to the SP. For example, an SP can specify that its commitment level is higher for a first type of service request and lower for a second type of service request, even though it can handle both types. The higher commitment level can be used to indicate to the SM that the SP prefers to handle the first type of request. On the other hand, the lower commitment level can be used to indicate to the SM that the SP can handle the second type of service request, but it is not preferred by the SP. Accordingly, the low commitment level can be used by the SM for subsequent rerouting to another SP with a high commitment level to processing the second type of service request.

In the various embodiments, the commitment level can be specified in any manner. In a basic example, a two-level commitment level system can be used. In this example, preferred and non-preferred levels can be used. A SP specifying a preferred level for a service request indicates that the SP prefers to exclusively handle service requests of the particular type. A SP specifying a non-preferred level for a service request type indicates that the SP can handle these type of service request, but it need not do so exclusively, or at all. In other embodiments, additional levels of commitment can be specified. Accordingly, for each type of service requests, any number of SP's can specify any number of commitment levels for handling the service requests.

In the various embodiments of the present invention, service requests can be handled using SP's that are external to the SM, internal to the SM, or any combination thereof. Like the types of service requests needed, the types of service requests the SP's can handle and the associated commitments levels can be specified to the SM in several ways. In some embodiments, an administrative interface can be used to access the SM and define the various types of requests that can be handled by the SP's. In another embodiment, the SM can contact the SP's directly and retrieve the service request handling and commitment level information. For example, an SM can poll the various SP's current available. In yet another embodiment, the various SP's can register with the SM and provide the SM with the various type of service requests each SP can handle and the associated commitment level.

The types of service requests handled by the SP's can be stored in a location accessible to the SM. For example, referring back to the Java ORB-based implementation, the SP's can be registered as server objects providing specific types of services at various commitment levels. In other embodiments, the services required can simply be stored as a list of service requests that can be handled by the various SP's and their associated commitment levels.

In some embodiments of the present invention, prior to distributing various types of service request to SP's distributed over a network, the SM can determine if any or all the service requests can be handled by local or internal SP's. Such a configuration can be advantageous in cases whether the various SP's are distributed such that transmission delays over a network are equal or to greater than any reduced time in processing at a remote SP capable of handling the service request. Alternatively, such a configuration can be used for dividing the service requests into categories, where one category is preferentially processed locally. For example, certain types of service requests can be associated with higher levels of security than other. For such high level security requests, it can be preferred to handle requests locally rather than risking transmission of secure information over an unsecured network.

Accordingly, the SM can first determine in step 206 whether the SM has any internal SP's (or if any local SP's are available) and in step 208 whether the internal SP's can handle any of the service request types. If the answer is yes to both of these conditions, the SM, in step 210, can be configured to route these types of service requests to the internal SP's. Once the SM is configured in step 210, the SM can then determine whether the SM still needs to be configured to route any other known types of service requests in step 212. If it is determined in step 212 that the SM has already been configured to route all known service request types, the method 200 can end in step 214. However, in some embodiments, additional or existing client system can specify additional types of service requests at a later time. Therefore, in these embodiments, the method 200 can restart at step 204 to determine if additional service request types have been specified and to configure the SM to route these types of service requests to the appropriate SP.

In the various embodiments of the present invention, the SM is configured to route service requests to SP by generating a request type to service provider map. The map is accessed as service requests are received by the SM and can be used as a lookup table to determine which SP is current associated with handling of a specific type of service request. Therefore, upon receipt of a request, the service request is sent to the appropriate service provider, as specified in the lookup table. However, in some embodiments, the receipt of a service request need not result in a physical routing of the service request. Rather routing of service requests can instead comprise invocation of a service provider software object stored in a local or remote location. For example, referring back to the Java ORB example, the service requests are not physically routed, but rather the act of accessing the lookup table initializes and generates an instance of a server object registered with the Java ORB and specified in the lookup table for handling the type of service request.

Referring back to FIG. 2, if the conditions of steps 206 or 208 are not met, or if it is determined that the SM still needs to be configured for routing at least one other service request type in step 212, the method proceeds to step 216. In step 216, the SM compares the various external SP's to determine which SP's can handle the additional service request type.

Afterwards, in step 218, if at least two of the SP's specify they can handle the same types of service requests, they are further compared to determine which SP the service requests should be routed to in step 220. If not, then the SM routes service requests to the SP's according to the service requests they can handle in step 219. However, if an overlap is found in step 218, the SM is configured to determine one of the duplicate function SP's to route the particular service request types to in step 220. The SM can be configured based on one or more criteria and/or the commitment levels specified by the SP's. Accordingly, the service requests can be routed to the SP's having the highest commitment level. Additionally, if one or more of the SP's have the same highest commitment level, the SM can determine the one of the SP's to be used based on one or more criteria. For example, a priority level can be associated with each of the SP's. In another example, operating characteristics of the SP's can be compared, including physical, computing, or network characteristics of the SP's, to determine the better SP to route the service requests to.

In cases, where a determination cannot be made or a clash is otherwise detected by the SM, the SM can generate an error message in step 222. In some embodiments, even if a determination can be made in step 220, an error message can still be generated to indicate to an administrator that a possible clash existed. Accordingly, the error messages can be used or stored in an error log for determining whether the SM needs to be further configured or if additional criteria needs to be specified for comparing the various SP's.

Once the SM is configured to route a service request type to an SP, the SM determines if routing of any other service request types is still needed in step 224. If other service request types still need to be routed in step 224, steps 218-222 are repeated until the SM is configured to route all known types of service requests. If all routing is complete in step 224, the method can end in step 214. However, in some embodiments, additional SP's can be added at any point in time, including SP's that have a higher commitment level for a particular service request or SP's that better meet routing criteria.

In such embodiments, the SM can search for additional SP's in step 228. For example, as SP's register with the Java ORB, the SM can poll the new SPs to determine which services they can prove and the associated commitment levels. If no additional SP's are found in step 230, the method can end in step 214 or the SM can continue to search for additional SP's. If additional SP's are found in step 230, the SM can determine the capability of the additional SP's to handle service requests and the associated commitment levels in step 232. If the additional SP's do not handle any service request types already handle by one of the current SP's in step 234, the method can end in step 214 or the SM can continue to look for additional SP's. If an additional SP is found that can handle a service already being handled by a current SP in step 234, the SM can compare the commitment levels of the current and additional SP's in step 236.

If the commitment level of the additional SP is greater than the commitment level of the current SP in step 238, the SM can be configured to reroute the service request types to the additional SP in step 240. This rerouting is performed automatically, without providing notice to the current SP, as its low commitment level to the service request type indicates that its bid for handling the service request type was retractable. The method can then end in step 214 or the SM can continue to look for additional SP's. However, if the commitment level is not greater for the additional SP in step 238, but is equal to that of the current SP in step 242, the SM can be configured to reroute service requests to the additional SP only if a comparison of criteria of the current and additional SP's warrants a change. The method can then end in step 214 or the SM can continue to look for additional SP's. If the commitment level of the additional SP is less than that of the current SP, then the routing is left unchanged and the method can then end in step 214 or the SM can continue to look for additional SP's. As previously described, if two or more additional SP's have the same higher commitment level, one or more criteria can be used to compare the additional SP's to determine a one to be used for the type of service requests.

Upon reviewing the aforementioned embodiments, it would be evident to one of ordinary skill in the art that the embodiments can be modified, reduced, or enhanced without departing from the scope and spirit of the claims described below. For example, although method 200 illustrates that the loop for detecting additional service request types (steps 205-212) and the loop for detecting additional SP's (steps 228-244) separately, one of ordinary skill in the art will recognize that such loops can run concurrently or that the entire method 200 can be continuously repeated. In another related example, the search for additional SP's can be configured to occur only when the SM determines that an additional service request type has been defined or if a current SP is unavailable. Such a configuration limits the amount of changes and further limits the need for continuously checking the client systems and the SP's for changes. In still another example, although the priority level for local or internal SP's can be higher, the decision to use a local, remote, external, or internal SP's can initially be based on a commitment level, regardless of SP location. That is, even if an internal or local SP can handle a service request type, the service request type can be routed to a higher commitment level SP in an external or remote location, as previously described. In yet another example, a combination of commitment level and routing criteria can be used to determine which SP to route service requests to. In such embodiments, the commitment level of an SP and a degree of an SP matching a criteria can be used to calculate a total score for an SP. The scores can then be calculated for the various SP's to determine the SP to use. In some cases, the commitment level and/or the routing criteria can be weighted to increase or decrease their importance in determining the proper routing for the service request.

Figure 3:
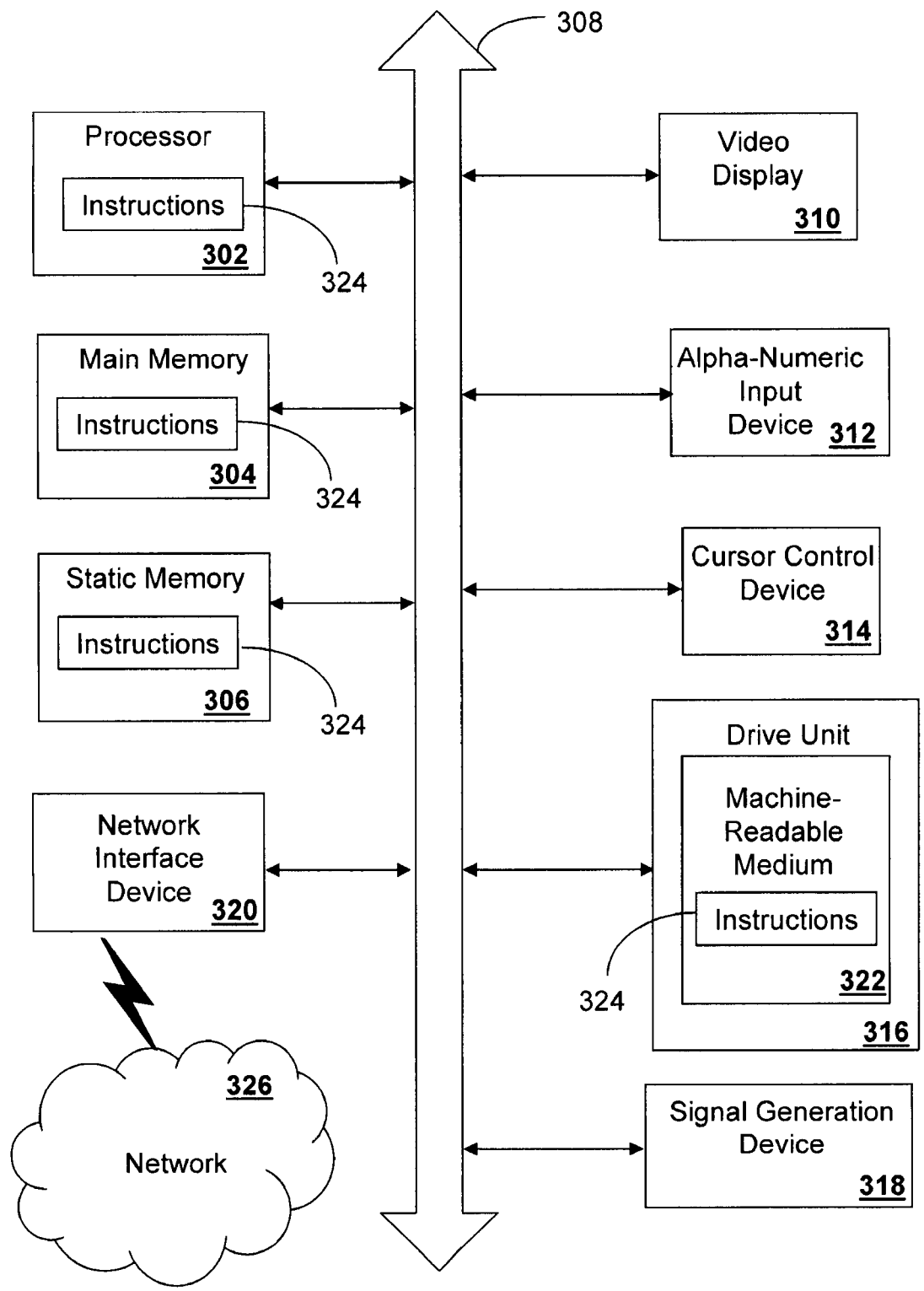
FIG. 3 is a schematic view of a computer system within which a set of instructions operate that is useful for understanding the present invention.

FIG. 3 is a schematic diagram of a computing system 300 for executing a set of instructions that, when executed, can cause the computing system 300 to perform one or more of the methodologies and procedures described above for the SM 102 in FIG. 1. In some embodiments, the computing system 300 operates as a standalone device. In other embodiments, the computing system 300 can be connected (e.g., using a network) to other computing devices. In a networked deployment, the computing system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" or "computing system" shall be understood to include any collection of computing devices that individually or jointly execute a set (or multiple sets) of instructions to perform any one or more of the methodologies discussed herein.

The computing system 300 includes a processor 302 (such as a central processing unit (CPU), a graphics processing unit (GPU, or both), a main memory 304 and a static memory 306, which communicate with each other via a bus 308. The computing system 300 further includes a display unit 310, such as a video display (e.g., a liquid crystal display or LCD), a flat panel, a solid state display, or a cathode ray tube (CRT)). The computing system 300 includes an input device 312 (e.g., a keyboard), a cursor control device 314 (e.g., a mouse), a disk drive unit 316, a signal generation device 318 (e.g., a speaker or remote control) and a network interface device 320.

The disk drive unit 316 includes a computer-readable storage medium 322 on which is stored one or more sets of instructions 324 (e.g., software code) configured to implement one or more of the methodologies, procedures, or functions described herein. The instructions 324 can also reside, completely or at least partially, within the main memory 304, the static memory 306, and/or within the processor 302 during execution thereof by the computing system 300. The main memory 304 and the processor 302 also can constitute machine-readable media.

Those skilled in the art will appreciate that the computer system architecture illustrated in FIG. 3 is one possible example of a computer system. However, the invention is not limited in this regard and any other suitable computer system architecture can also be used without limitation.

Dedicated hardware implementations including, but not limited to, application specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a non-transitory computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320.

While the non-transitory computer-readable storage medium 322 is shown in an exemplary embodiment to be a single storage medium, the term "non-transitory computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure.

The term "non-transitory computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A computer-implemented method for processing service requests in a distributed environment, comprising:
   routing a type of service request to a first service provider in said distributed environment, said first service provider having a commitment level for handling said type of service request;
   detecting a second service provider in said distributed environment capable of handling said type of service request;

determining a commitment level of said second service provider to handle said type of service request;

calculating a score for each of said first and second service providers using a respective one of said commitment levels and a degree of said first or second service provider matching a criteria;

determining if said score of said second service provider exceeds said score of said first service provider; and responsive to a determination that said score of said second service provider exceeds said score of said first service provider, routing said type of service request to said second service provider, wherein said commitment levels of said first and said second service providers specify a relative preference of each of said first and said second service providers for handling said type of service request.

2. The method of claim 1, further comprising:

responsive to a determination that said score of said second service provider equals said score of said first service provider, determining if said degree of said second service provider is larger than said degree of said first service provider; and if said degree of said second service provider is larger than said degree of said first service provider, routing said service request to said second service provider.

3. The method of claim 1, wherein said criteria comprises at least one among a priority level of said first and said second service providers and an operating characteristic of said first and said second service providers.

4. The method of claim 1, wherein said method further comprises:

polling a plurality of service providers in said distributed environment, said polling requesting at least a commitment level of each of said plurality of service providers to handle said type of service request; and selecting said first service provider from said plurality of service providers based on said criteria and a response of at least one of said plurality of service providers to said polling request.

5. The method of claim 1, wherein said routing is performed by a service manager, and wherein said plurality of service providers comprise a service provider external to said service manager and a service provider internal to the service manager.

6. The method of claim 5, wherein said criteria specifies automatically selecting said internal service provider.

7. A system for processing service requests in a distributed environment, comprising:

a memory for storing instructions;

a first service provider device for handling at least one type of service request, said first service provider device specifying a commitment level for handling said type of service request;

at least one second service provider device for handling at least said type of service request, said second service provider device specifying a commitment level for handling said type of service request; and a service manager device for initially routing said type of service request to said first service provider device and selectively rerouting said type of service request to said second service provider device;

wherein said service manager device is further configured to calculate a score for each of said first and second service providers using a respective one of said commitment levels and a degree of said first or second service provider matching a criteria, and compare said scores of said first service provider device and said second service provider device to each other, wherein said type of service request is selectively rerouted to said second service provider device responsive to said score of said second service provider device exceeding said score of said first service provider device, and wherein said commitment levels of said first and said second provider devices specify a relative preference of each of said first and said second provider devices for handling said type of service request.

8. The system of claim 7, wherein said service manager device is further configured to determine if said degree of said second service provider device exceeds said degree of said first service provider device, in response to said score of said second service provider device equaling said score of said first service provider device, and route said type of service request to said second service provider device if said degree of said second service provider device exceeds said degree of said first service provider device.

9. The system of claim 7, wherein said criteria comprises preferring at least one among a priority level of said first and said second service provider devices and an operating characteristic of said first and said second service provider devices.

10. The system of claim 7, further comprising a plurality of first service provider devices, and wherein said service manager device is further configured to:

poll said plurality of first service provider devices, said polling requesting at least a commitment level of each of said plurality of first provider devices to handle said type of service request; and select said first service provider device from said plurality of first service provider devices based on said criteria and a response of at least one of said plurality of first service provider devices to said polling request.

11. The system of claim 7, wherein said service manager device further comprises at least one internal service provider device for handling said type of service request.

12. The system of claim 11, wherein said criteria specifies automatically selecting said internal service provider device.

13. A device comprising a non-transitory computer-readable storage medium, having stored thereon a computer program for processing service requests in a distributed environment, the computer program having a plurality of code sections, the code sections executable by a computer to cause the computer to perform the steps of:

routing a type of service request to a first service provider in said distributed environment, said first service provider having a commitment level for handling said type of service request;

detecting a second service provider in said distributed environment capable of handing said type of service request;

determining a commitment level of said second service provider to handle said type of service request;

calculating a score for each of said first and second service providers using a respective one of said commitment levels and a degree of said first or second service provider matching a criteria;

determining if said score of said second service provider exceeds said score of said first service provider; and responsive to a determination that said score of said second service provider exceeds said score of said first service provider, routing said type of service request to said second service provider, wherein said commitment levels of said first and said second service providers specify a preference of each of said first and said second service providers for handling said type of service request.

14. The device of claim 13, further comprising code sections for causing the computer to perform the steps of:
responsive to a determination that said score of said second service provider equals said score of said first service provider, determining if said degree of said second service provider is larger than said degree of said first service provider; and
if said degree of said second service provider is larger than said degree of said first service provider, routing said service request to said second service provider.

15. The device of claim 13, wherein said criteria comprises at least one among a priority level of said first and said second service providers and an operating characteristic of said first and said second service providers.

16. The device of claim 13, wherein said computer is further caused to perform the steps of:
polling a plurality of service providers in said distributed environment, said polling requesting at least a commitment level of each of said plurality of service providers to handle said type of service request; and
selecting said first service provider from said plurality of service providers based on said criteria and a response of at least one of said plurality of service providers to said polling request.

17. The device of claim 13, wherein said routing is performed by a service manager, and wherein said plurality of service providers comprise a service provider external to said service manager and a service provider internal to the service manager, and wherein said criteria specifies automatically selecting said internal service provider.

* * * * *